(12) United States Patent
Kazeminejad et al.

(10) Patent No.: US 9,537,547 B1
(45) Date of Patent: Jan. 3, 2017

(54) USER EQUIPMENT SRS SELECTION WITH NETWORK NODE INTELLIGENCE FOR BEAMFORMING PERFORMANCE IMPROVEMENT

(71) Applicant: Spring Communications Company L.P., Overland Park, KS (US)

(72) Inventors: Saied Kazeminejad, Ashburn, VA (US); Sungki Park, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 273 days.

(21) Appl. No.: 14/321,906

(22) Filed: Jul. 2, 2014

(51) Int. Cl.
*H04W 4/00* (2009.01)
*H04B 7/04* (2006.01)

(52) U.S. Cl.
CPC .................. *H04B 7/0421* (2013.01)

(58) Field of Classification Search
None
See application file for complete search history.

(56) References Cited

U.S. PATENT DOCUMENTS

| 7,729,714 | B2 | 6/2010 | Black et al. | |
| 9,154,284 | B1* | 10/2015 | Park | H04L 5/006 |
| 2009/0247229 | A1* | 10/2009 | Teo | H04B 7/0874 |
| | | | | 455/562.1 |
| 2009/0316756 | A1* | 12/2009 | Ro | H04B 7/0684 |
| | | | | 375/133 |
| 2010/0067632 | A1* | 3/2010 | Jia | H04L 25/0204 |
| | | | | 375/371 |
| 2011/0143807 | A1* | 6/2011 | Aue | H04B 7/0413 |
| | | | | 455/522 |
| 2011/0200143 | A1* | 8/2011 | Koo | H04B 7/0697 |
| | | | | 375/299 |
| 2012/0008510 | A1 | 1/2012 | Cai et al. | |
| 2012/0182857 | A1* | 7/2012 | Bertrand | H04J 13/0062 |
| | | | | 370/210 |
| 2012/0202558 | A1* | 8/2012 | Hedberg | H04L 5/0058 |
| | | | | 455/550.1 |
| 2012/0230274 | A1* | 9/2012 | Xiao | H04B 7/024 |
| | | | | 370/329 |
| 2013/0078913 | A1* | 3/2013 | Lee | H04L 5/0007 |
| | | | | 455/39 |
| 2013/0170574 | A1* | 7/2013 | Fleming | H04B 7/024 |
| | | | | 375/267 |
| 2013/0229989 | A1* | 9/2013 | Natarajan | H04W 72/042 |
| | | | | 370/329 |
| 2013/0272257 | A1* | 10/2013 | Takaoka | H04W 52/42 |
| | | | | 370/329 |
| 2014/0003262 | A1* | 1/2014 | He | H04W 28/08 |
| | | | | 370/252 |
| 2014/0073356 | A1* | 3/2014 | Siomina | H04W 4/02 |
| | | | | 455/456.2 |

(Continued)

*Primary Examiner* — Jay P Patel

(57) ABSTRACT

User Equipment (UE) selects a Sounding Reference Signal (SRS) pattern and transmits orthogonal frequency-division multiplexing (OFDM) symbols according to the selected SRS pattern. The OFDM communication system wirelessly receives data from the UE and processes the data to detect the OFDM symbols. The detected OFDM symbols are processed to identify the selected SRS pattern. An impulse response matrix is generated based on the selected SRS pattern. Additional data based on the impulse response matrix can be transferred to the UE.

20 Claims, 9 Drawing Sheets

(56) References Cited

U.S. PATENT DOCUMENTS

| | | | |
|---|---|---|---|
| 2014/0126510 A1* | 5/2014 | Ogawa | H04L 5/0053 370/329 |
| 2014/0169326 A1* | 6/2014 | Levanen | H04W 56/00 370/330 |
| 2014/0241242 A1* | 8/2014 | Josiam | H04W 88/02 370/328 |
| 2015/0009951 A1* | 1/2015 | Josiam | H04L 25/0224 370/330 |
| 2015/0236882 A1* | 8/2015 | Bertrand | H04L 5/0048 370/329 |

* cited by examiner

USER EQUIPMENT SRS SELECTION WITH NETWORK NODE INTELLIGENCE FOR BEAMFORMING PERFORMANCE IMPROVEMENT

TECHNICAL BACKGROUND

Long Term Evolution (LTE) is wireless network technology based on orthogonal frequency-division multiplexing (OFDM). OFDM is a method of encoding digital data on multiple carrier frequencies. OFDM has developed into a popular scheme for wideband digital communication, whether wireless or over copper wires, used in applications such as digital television and audio broadcasting, DSL Internet access, wireless networks, powerline networks, and 4G mobile communications.

Multiple-Input Multiple-Output (MIMO) is a multi-antenna technique implemented in LTE. In addition to MIMO, LTE networks also use beamforming techniques. Transmit beamforming works by exploiting the interference patterns observed whenever the same signal is transmitted from two or more spatially separated transmission points.

Sounding reference signals (SRS) are transmitted on the LTE uplink and allow the network to estimate the quality of the uplink channel for a specific User Equipment (UE) at different frequencies. Estimating uplink channel quality allows evolved Node B (eNodeB) network elements to make smart decisions for resource allocation for uplink transmission, link adaptation and to decode transmitted data from UE.

Currently, the network node (eNodeB) must select an explicit SRS pattern and schedule resource blocks and transmit this information to UE. UE responds to the instructions provided by the network node with the selected SRS pattern at the scheduled time. Requiring the network node to select SRS patterns and schedule resource blocks consumes valuable network node resources.

OVERVIEW

User Equipment (UE) selects a Sounding Reference Signal (SRS) pattern and transmits orthogonal frequency-division multiplexing (OFDM) symbols according to the selected SRS pattern. The OFDM communication system wirelessly receives data from the UE and processes the data to detect the OFDM symbols. The detected OFDM symbols are processed to identify the selected SRS pattern. An impulse response matrix is generated based on the selected SRS pattern. Additional data based on the impulse response matrix can be transferred to the UE.

DETAILED DESCRIPTION

Figure 1:
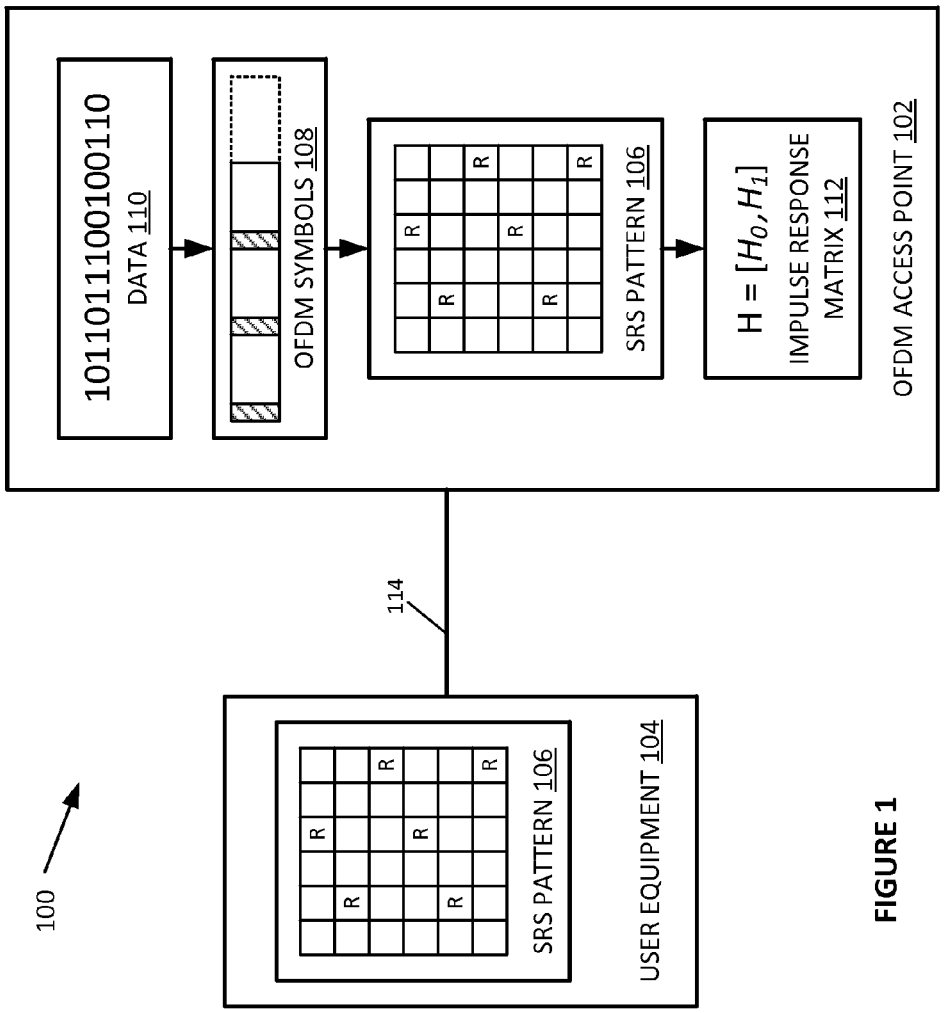
FIGS. 1-2 illustrate a wireless communication system to allow UE SRS selection with network node intelligence for beamforming performance improvement.

FIG. 1 illustrates OFDM communication system 100 to allow UE SRS selection with network node intelligence for beamforming performance improvement. OFDM communication system 100 comprises OFDM access point 102, UE 104, and wireless link 114. OFDM access point 102 and UE 104 communicate via wireless link 114. OFDM access point 102 comprises eNodeBs, wireless access points, gateways, control systems, routers, servers, communication links, and/or other network elements including combinations thereof. UE 104 comprises computer and communication circuitry, data memory, and associated software/hardware components. UE 104 can be a telephone, computer, media player, gaming apparatus, internet appliance, or some other machine capable interfacing with OFDM access point 102. Wireless link 114 comprises OFDM electromagnetic signals.

OFDM access point 102 receives and processes data 110. Data 110 comprises OFDM symbols 108 that can be processed to detect SRS pattern 106 contained within. Impulse response matrix 112 is generated from SRS pattern 106 by OFDM access point 102. Impulse response matrix 122 comprises values to calculate additional data to be transmitted by OFDM access point 102 to UE 104. For example, impulse response matrix 112 can be used to calculate controlling beamforming parameters, MIMO parameters, signal interference patterns and the like.

Figure 2:
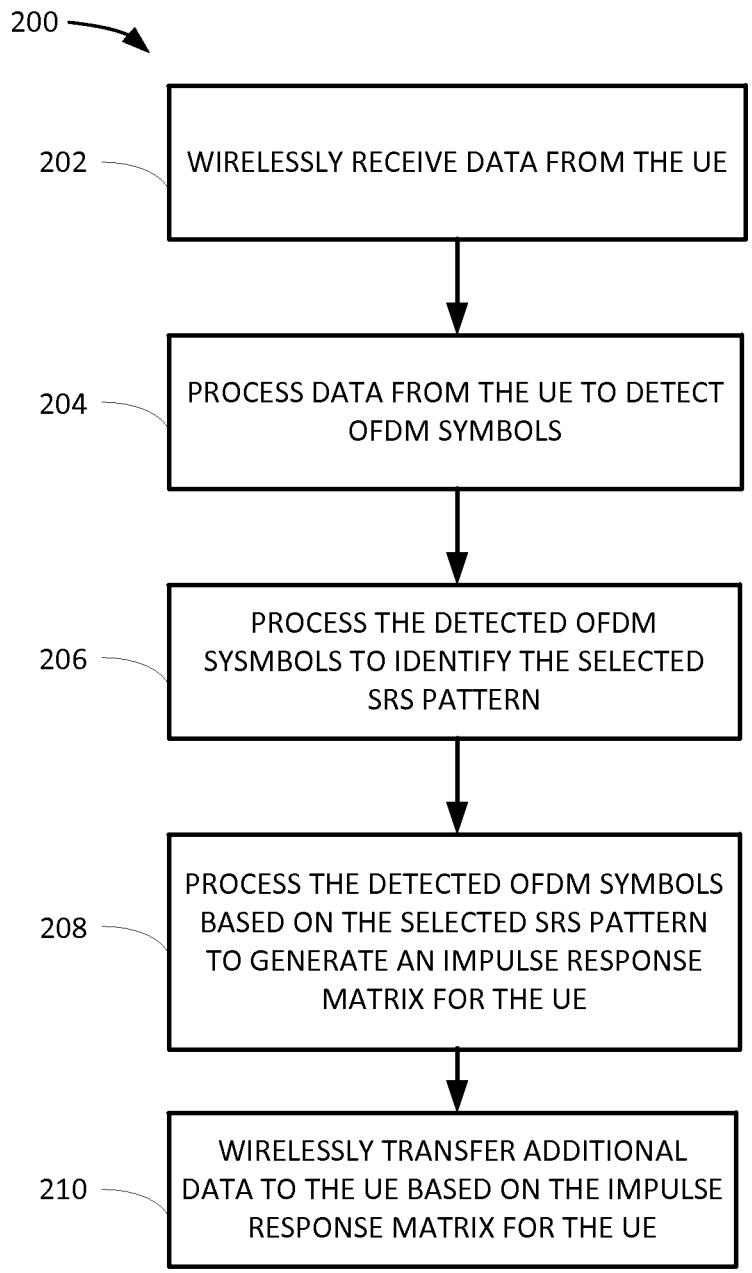

FIG. 2 illustrates the operation of OFDM communication system 100 to improve beamforming performance. UE 104 selects SRS pattern 106 and wirelessly transmits data 110 containing OFDM symbols 108 according to selected SRS pattern 106. OFDM access point 102 receives data 110 wirelessly transmitted by UE 104. (202) Data 110 is processed by OFDM access point 102 to detect OFDM symbols 108. (204) OFDM symbols 108 are processed to identify SRS pattern 106 selected and transmitted by UE 104. (206) Operations equivalent to Fast Fourier Transform operations (FFT) may be used to retrieve the SRS pattern 106, for example. SRS pattern 106 is processed by OFDM access point 102 to generate an impulse response matrix 112 for UE 104. (208) Additional data is wirelessly transferred to the UE 104 based on impulse response matrix 112. (210)

OFDM access point 102 identifies SRS pattern 106 selected and transmitted by UE 104. OFDM access point 102 utilizes various methods to detect SRS pattern 106. Pattern matching techniques described herein may be used independently or in combination by OFDM access point 102 to detect SRS pattern 106, although other methods may be used. If SRS patterns are limited to a finite number, then SRS pattern 106 transmitted by UE 104 can be detected by comparing it to all possible combinations of SRS patterns. This method could be implemented by a series of "if-then" statements or by more advanced parallel processing methods. Alternatively, OFDM access point 102 can identify SRS pattern 106 even when the SRS patterns are unknown to OFDM access point 102. OFDM access point 102 collects SRS symbols inserted into LTE resource blocks by UE 104 with respect to time and frequency. OFDM access point 102 compares the placement of SRS symbols within incoming resource blocks and searches for patterns of SRS symbol placement within the resource blocks. OFDM access point 102 assumes SRS pattern 106 is identified when a pattern is established. Other pattern matching and detecting techniques may be used by OFDM access point 102.

Figure 3:
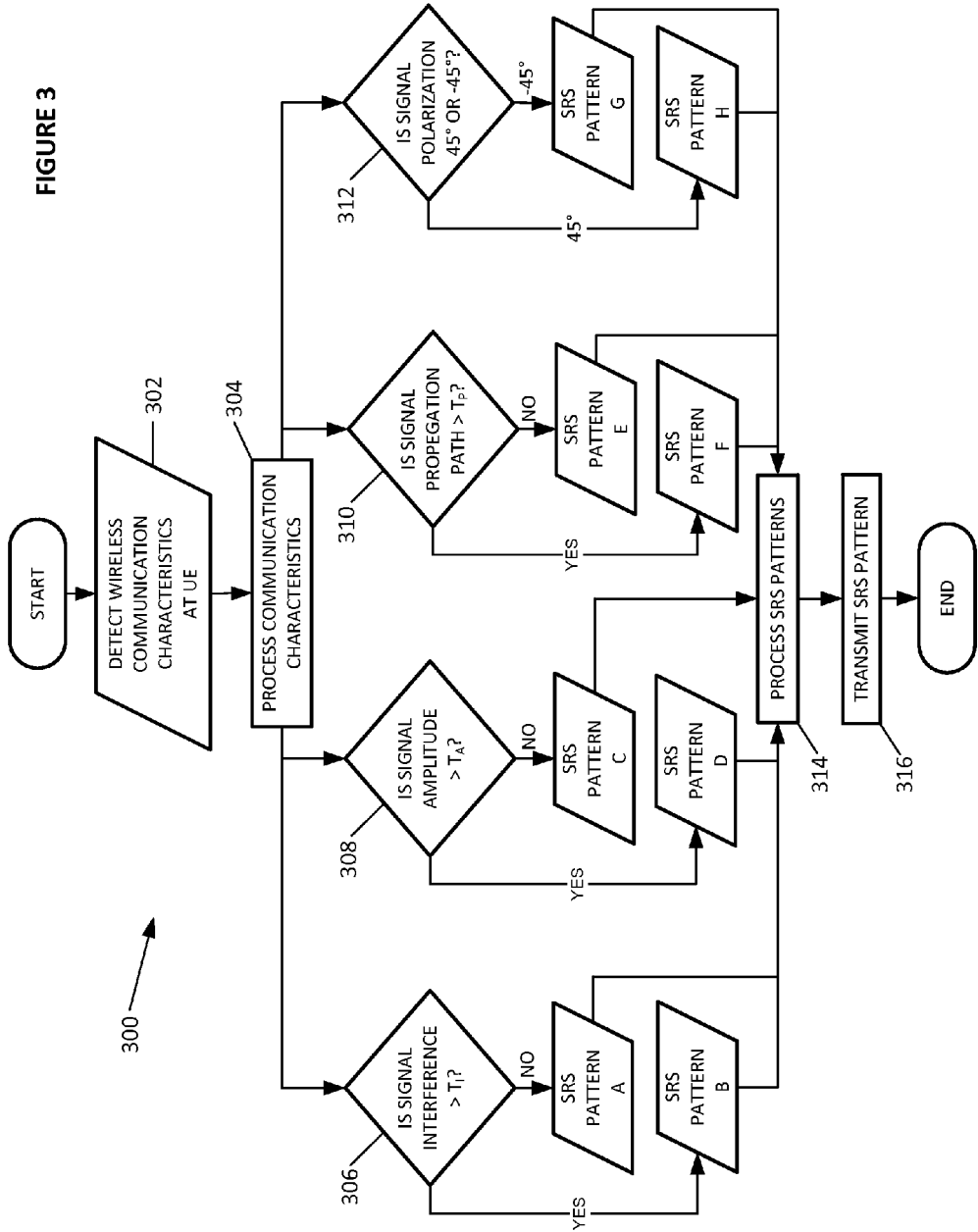
FIGS. 3-6 illustrate optional wireless communication system operations to allow UE SRS selection with network node intelligence for beamforming performance improvement.

FIG. 3 illustrates a flowchart 300 describinga method of operating UE 104 to select SRS pattern 106 based on wireless communication characteristics detected at UE 104. Flowchart 300 provides an example of OFDM communication system 100, although OFDM communication system 100 may have alternative configurations and operations. Wireless communication characteristics comprise signal strength, signal propagation paths, signal interference, signal polarization, signal amplitude, and other parameters that affect radio frequency signal transmission. UE 104 uses wireless communication characteristics individually or in combination to select SRS pattern 106. For example, UE 104 may use signal amplitude alone to select SRS pattern 106, or UE 104 may use a signal interference measurement in combination with the signal propagation path to select SRS pattern 106.

To begin, UE 104 detects wireless communication characteristics. (302) Wireless communication characteristics are continuously variable and are affected by a multitude of factors. Weather, location, geography and topography are just some examples of factors that can affect wireless communication characteristics. UE 104 processes communication characteristics to quantify the wireless communication characteristics. (304) Solving for ratios, averages, minimums and maximums are some examples of mathematical operations used by UE 104 to quantify wireless communication characteristics.

UE 104 uses the processed and quantified wireless communication characteristics to select SRS pattern 106. Signal interference is one factor that UE 104 may use to select SRS pattern 106. Signal interference, $T_I$ in FIG. 3, can be quantified into a maximum allowable amount, an average allowable amount, a ratio or some other mathematical quantification function. UE 104 determines that signal interference is greater than some acceptable metric and selects SRS pattern B. (306) Alternatively, UE 104 determines that signal interference is less than some acceptable metric and selects SRS pattern A. (306)

Signal amplitude is another factor that can affect wireless communication characteristics at UE 104. Signal amplitude, $T_A$ in FIG. 3, can be quantified into a maximum allowable amount, an average allowable amount, a ratio or some other mathematical quantification function. UE 104 determines that signal amplitude is greater than some acceptable metric and selects SRS pattern D. (308) Alternatively, UE 104 determines that signal amplitude is less than some acceptable metric and selects SRS pattern C. (308)

Signal propagation path is another factor that can affect wireless communication characteristics at UE 104. Signal propagation path, $T_P$ in FIG. 3, can be quantified into a heading, velocity, maximum allowable amount, an average allowable amount, a ratio or some other mathematical quantification function. UE 104 determines that signal propagation path is greater than some acceptable metric and selects SRS pattern F. (310) Alternatively, UE 104 determines that signal propagation path is less than some acceptable metric and selects SRS pattern E. (310)

Signal polarization is another factor that can affect wireless communication characteristics at UE 104. Signal polarization can be quantified by degrees based on signal strengths and other factors detected at the receiving antenna. UE 104 determines that signal polarization is 45° and selects SRS pattern H. (312) Alternatively, UE 104 determines that signal polarization is −45° and selects SRS pattern G. (312)

UE 104 may have multiple different SRS patterns 106 selected based on different wireless communication characteristics after processing the multiple factors the affect the wireless communication characteristics. UE 104 processes the available SRS patterns and selects one. (314) Alternatively, UE 104 can select multiple SRS patterns. (314) SRS pattern 106 is transmitted by UE 104. (316)

Figure 4:
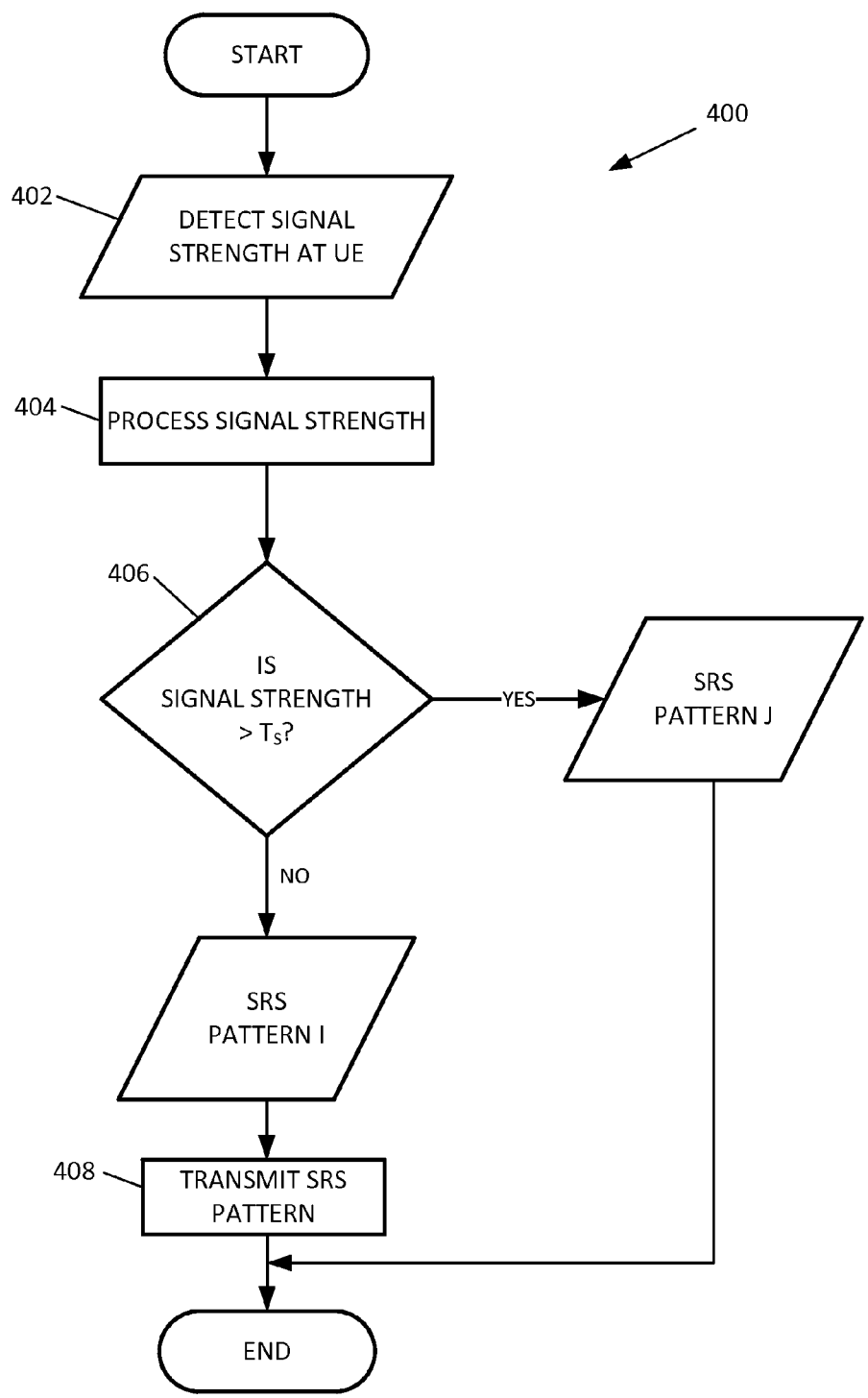

FIG. 4 illustrates a flowchart 400 describing the operation of UE 104 to select SRS pattern 106 based on signal strength detected at UE 104. Flowchart 400 provides an example OFDM communication system 100, although OFDM communication system 100 may have alternative configurations and operations. Signal strength, represented by $T_S$ in FIG. 4, is detected at UE 104. (402) UE 104 processes the signal strength to quantify using mathematic functions. (404) If the signal strength is greater than some metric, then UE 104 selects SRS pattern J. (406) Alternatively, if the signal strength is less than some metric, then UE 104 selects SRS pattern I. (406) UE 104 transmits the selected SRS pattern 106. (408)

Figure 5:
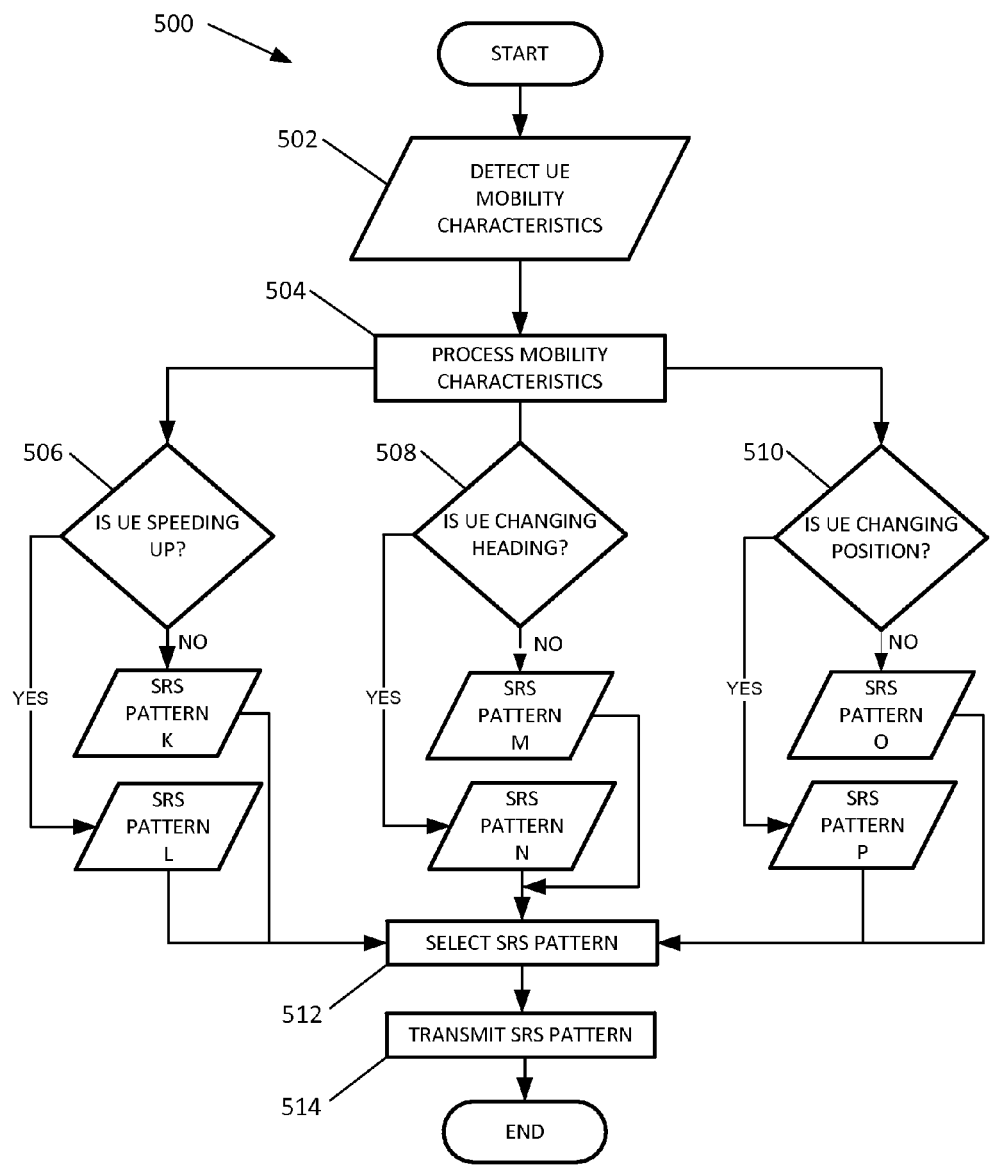

FIG. 5 illustrates a flowchart 500 describing the operation of UE 104 to select SRS pattern 106 based on mobility characteristics at UE 104. Flowchart 500 provides an example of OFDM communication system 100, although OFDM communication system 100 may have alternative configurations and operations. UE 104 detects mobility characteristics. (502) Mobility characteristics comprise speed, heading, position, and other parameters that locate and predict UE mobility. UE 104 uses mobility characteristics individually or in combination to select SRS patterns 106. For example, UE 104 may use speed alone to select SRS pattern 106, or UE 104 may use the heading in combination with the position to select SRS pattern 106.

To begin, UE 104 detects mobility characteristics. (502) UE 104 processes mobility characteristics to quantify speed, heading, position and other mobility factors. (304) Solving for ratios, averages, minimums and maximums are some examples of mathematical operations used by UE 104 to quantify mobility characteristics. UE 104 detects that it is speeding up and, in response, selects SRS pattern L. (506) Alternatively, UE 104 detects that it is slowing down and, in response, selects STS pattern K. (506) Likewise, UE 104 may determine that it is changing heading and, in response, selects SRS pattern N. (508) If UE 104 determines that it is not changing heading then SRS pattern M is selected. (508) UE 104 may detect that it is changing position and select SRS pattern P. (510) Alternatively, UE 104 may not be changing position and so selects SRS pattern O. (510)

UE 104 may have multiple different SRS patterns 106 selected based on different mobility characteristics after processing the multiple factors the affect the mobility characteristics. UE 104 processes the available SRS patterns and selects one. (512) Alternatively, UE 104 can select multiple SRS patterns. (512) SRS pattern 106 is transmitted by UE 104. (514)

Figure 6:
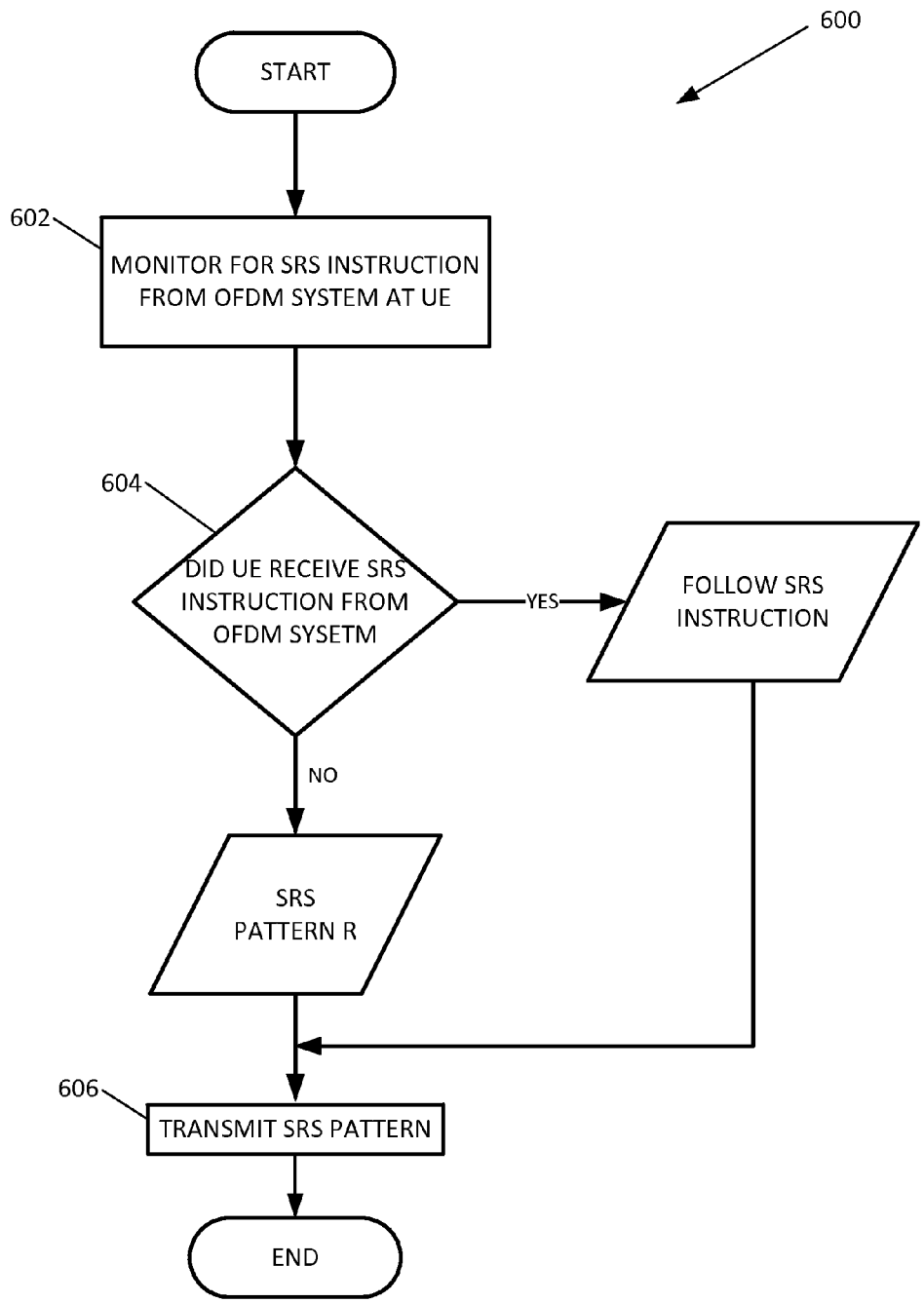

FIG. 6 illustrates a flowchart 600 describing the operation of UE 104 to select SRS pattern 106 without wirelessly receiving an SRS instruction from the OFDM system. Flowchart 600 provides an example of OFDM communication system 100, although OFDM communication system 100 may have alternative configurations and operations. UE 104 monitors wireless communications for a SRS instruction from OFDM communication system 100. (602) UE 104 determines whether or not it received a SRS instruction from the OFDM system. (604) If UE 104 receives an instruction from the OFDM system then it follows the SRS instruction. (604) If UE 104 does not receive an SRS instruction from the OFDM system, the it chooses a SRS pattern, in this case SRS pattern R is selected. (604) UE 104 transmits the selected SRS pattern. (606)

Figure 7:
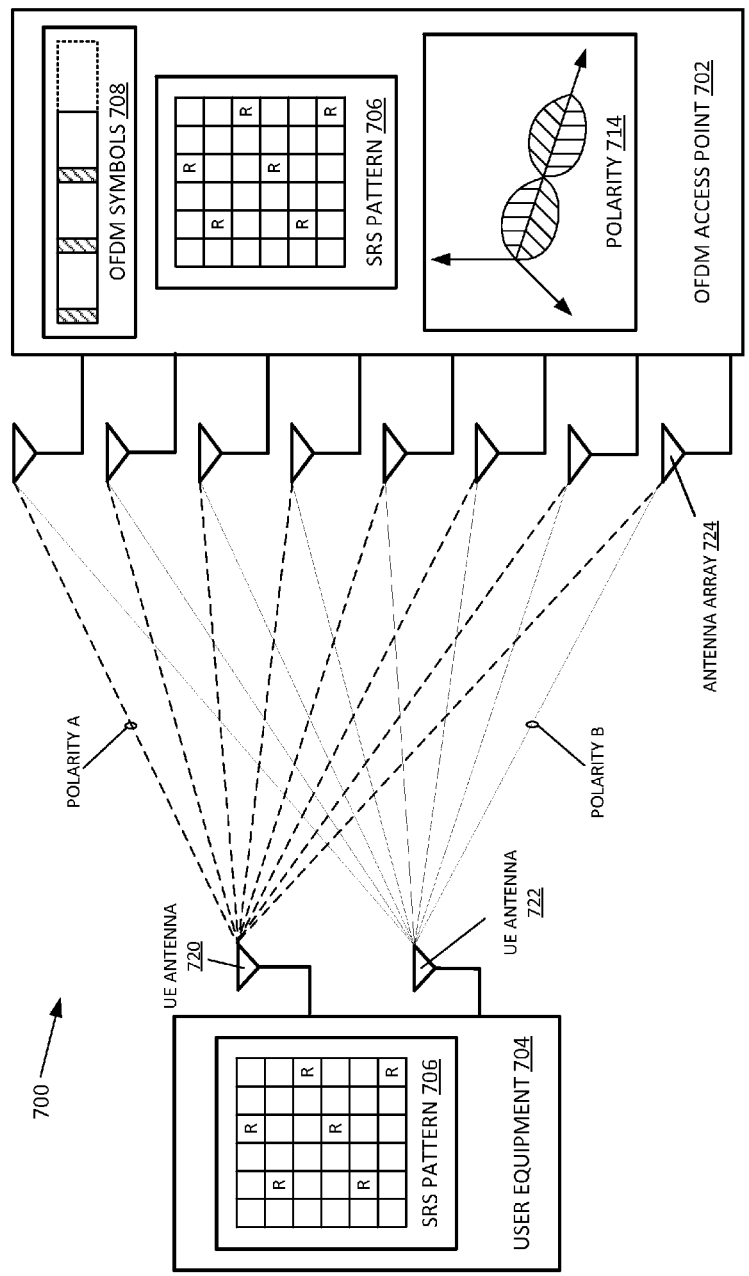
FIG. 7 illustrates a wireless communication system that identifies the transmitting antenna of UE by processing OFDM symbols or polarity to allow UE SRS selection with network node intelligence for beamforming performance improvement.

FIG. 7 illustrates OFDM communication system 700 that identifies the transmitting antenna of UE by processing OFDM symbols or polarity to allow UE SRS selection with network node intelligence for beamforming performance improvement. OFDM communication system 700 is an example of OFDM communication system 100, although OFDM communication system 100 may have alternative configurations and operations. OFDM communication system 700 comprises OFDM access point 702, UE 704, UE antenna 720, UE antenna 722, and antenna array 724. OFDM access point 702 and UE 704 communicate via antenna 720, 722 and antenna array 724. OFDM access point 702 comprises eNodeBs, wireless access points, gateways, control systems, routers, servers, communication links, and/or other network elements including combinations thereof. UE 704 comprises computer and communication circuitry, data memory, and associated software/hardware components. UE 704 can be a telephone, computer, media player, gaming apparatus, internet appliance, or some other machine capable interfacing with OFDM access point 702. Antenna array 724 comprises multiple antenna elements and is capable of MIMO and beamforming.

UE 704 selects SRS pattern 706 to transmit to OFDM access node 702. UE 704 has multiple UE antennas 720, 722 and can select to transmit on UE antennas 720, 722 simultaneously or alternatively. OFDM communication system 702 can determine which UE antenna 720, 722 transmitted by assigning particular OFDM symbols 708 to each UE antenna 720, 722. OFDM communication system 702 can detect polarity 714 of the signal transmitted by UE 704 based upon energy received by antenna array 724. UE antenna 720 transmits a signal having polarity A and UE antenna 722 transmits a signal having polarity B. OFDM access point 702 filters information based on the transmitting antenna 720, 722 to more quickly identify SRS pattern 706.

OFDM access point 702 identifies SRS pattern 706 selected and transmitted by UE 704. OFDM access point 702 can utilize various methods to detect SRS pattern 706. Pattern matching techniques described herein may be used independently or in combination by OFDM access point 702 to detect SRS pattern 706, although other methods may be used. If SRS patterns are limited to a finite number, then SRS pattern 706 transmitted by UE 704 can be detected by comparing it to all possible combinations of SRS patterns. This method could be implemented by a series of "if-then" statements or by more advanced parallel processing methods. Alternatively, OFDM access point 702 can identify SRS pattern 706 even when the SRS patterns are unknown to OFDM access point 702. OFDM access point 702 collects SRS symbols inserted into LTE resource blocks by UE 104 with respect to time and frequency. OFDM access point 702 compares the placement of SRS symbols within incoming resource blocks and searches for patterns of SRS symbol placement within the resource blocks. OFDM access point 702 assumes SRS pattern 706 is identified when a pattern is established. Other pattern matching and detecting techniques may be used by OFDM access point 702.

Figure 8:
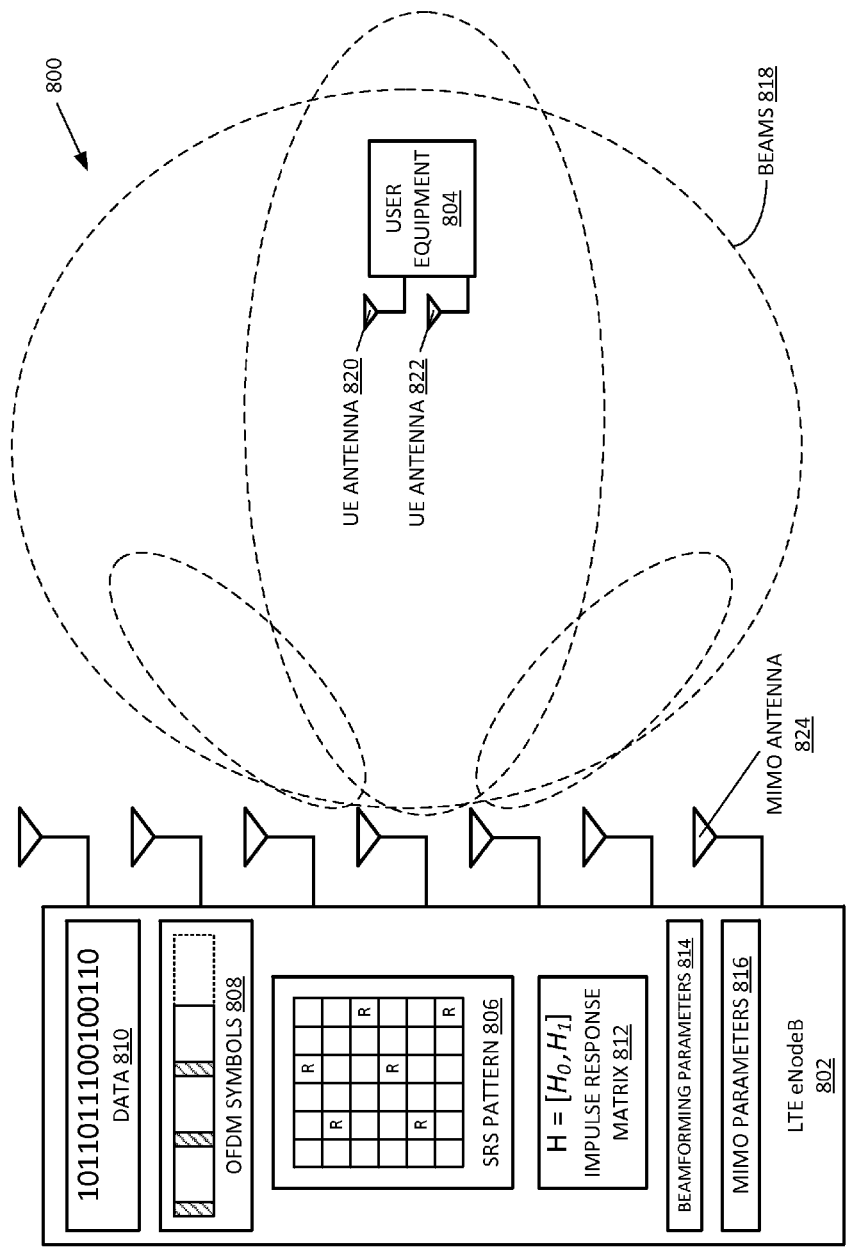
FIGS. 8-9 illustrate a LTE wireless communication system to allow UE SRS selection with network node intelligence for beamforming performance improvement.

FIG. 8 illustrates LTE communication system 800. LTE communication system 800 provides an example of OFDM communication system 100, although OFDM communication system 100 may have alternative configurations and operations. LTE communication system 800 comprises LTE eNodeB 802, UE 804, beams 818, UE antenna 820, UE antenna 822, and MIMO antenna 824. LTE eNodeB 802 processes data 810 to detect OFDM symbols 808. LTE eNodeB 802 then processes OFDM symbols 808 to identify SRS pattern 806. SRS pattern 806 is used to generate impulse response matrix 812. Impulse response matrix 812 is used to generate additional data for transmission to UE 804. In this example, additional data comprises beamforming parameters 814 and MIMO parameters 816.

LTE eNodeB 802 identifies SRS pattern 806 selected and transmitted by UE 804. LTE eNodeB 802 can utilize various methods to detect SRS pattern 806. Pattern matching techniques described herein may be used independently or in combination by LTE eNodeB 802 to detect SRS pattern 806, although other methods may be used. If SRS patterns are limited to a finite number, then SRS pattern 806 transmitted by UE 804 can be detected by comparing it to all possible combinations of SRS patterns. This method could be implemented by a series of "if-then" statements or by more advanced parallel processing methods. Alternatively, LTE eNodeB 802 can identify SRS pattern 806 even when the SRS patterns are unknown to LTE eNodeB 802. LTE eNodeB 802 collects SRS symbols inserted into LTE resource blocks by UE 804 with respect to time and frequency. LTE eNodeB 802 compares the placement of SRS symbols within incoming resource blocks and searches for patterns of SRS symbol placement within the resource blocks. LTE eNodeB 802 assumes SRS pattern 806 is identified when a pattern is established. Other pattern matching and detecting techniques may be used by LTE eNodeB 802.

Figure 9:
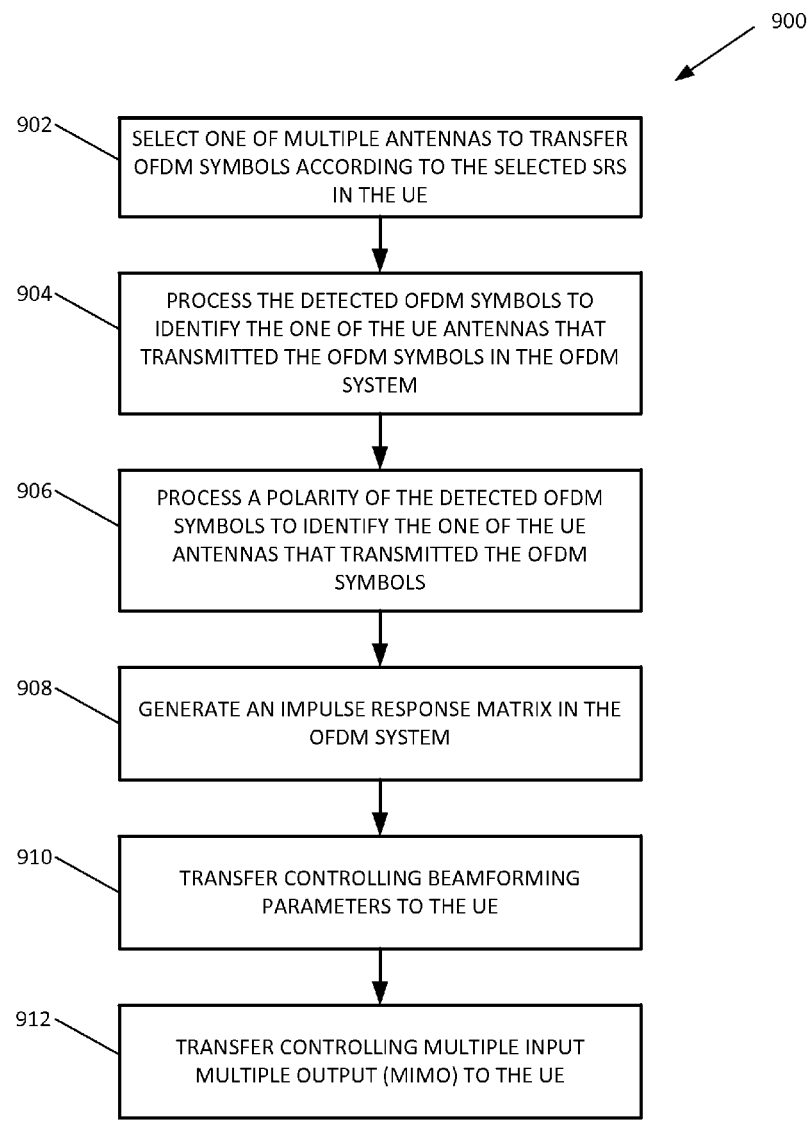

FIG. 9 illustrates the operation of LTE system 800 to improve beamforming performance. UE 804 selects antenna 820 from among antenna 820 and antenna 822 to transfer OFDM symbols 808 according to the SRS selected by UE 804. (902) LTE eNodeB 802 processes OFDM symbols 808 detected by MIMO antenna 824 to identify the one of UE 804 antennas 820, 822 that transmitted the OFDM symbols 808 in eNodeB 802. (904) In addition to, or instead of the, previous operation, eNodeB 802 processes a polarity of the detected OFDM symbols 808 to identify the one of UE 104 antennas 820, 822 that transmitted the OFDM symbols 808. (906) eNodeB 802 uses the OFDM symbols 808 from antenna 820 and antenna 822 to generate a complete impulse response matrix 812. (908) Impulse response matrix 812 is used to calculate beamforming parameters 814 and transmit them to UE 804. (910) Impulse response matrix 812 is also used to calculate controlling MIMO parameters and transmit them to UE 804. (912)

What is claimed is:

1. A method of operating an Orthogonal Frequency Division Multiplex (OFDM) communication system where a User Equipment (UE) selects a Sounding Reference Signal (SRS) pattern and transmits OFDM symbols according to the selected SRS pattern, the method comprising:
   wirelessly receiving data from the UE;
   processing the data received from the UE to detect the OFDM symbols;
   processing the detected OFDM symbols to identify the selected SRS pattern;
   processing the detected OFDM symbols based on the selected SRS pattern to generate an impulse response matrix for the UE; and
   wirelessly transferring additional data to the UE based on the impulse response matrix for the UE.

2. The method of claim 1 wherein the UE selects the SRS pattern based on wireless communication characteristics detected at the UE.

3. The method of claim 1 wherein the UE selects the SRS pattern based on wireless signal strength detected at the UE.

4. The method of claim 1 wherein the UE selects the SRS pattern based on UE mobility detected by the UE.

5. The method of claim 1 wherein the UE selects the SRS pattern without wirelessly receiving an SRS instruction from the OFDM system.

6. The method of claim 1 wherein:
the UE has multiple UE antennas and selects one of the UE antennas to transfer the OFDM symbols according to the selected SRS pattern; and
in the OFDM system, processing the detected OFDM symbols to identify the one of the UE antennas that transmitted the OFDM symbols.

7. The method of claim 1 wherein:
the UE has multiple UE antennas and selects one of the UE antennas to transfer the OFDM symbols according to the selected SRS pattern; and
in the OFDM system, processing a polarity of the detected OFDM symbols to identify the one of the UE antennas that transmitted the OFDM symbols.

8. The method of claim 1 wherein wirelessly transferring the additional data to the UE based on the impulse response matrix for the UE comprises controlling beamforming parameters for the transmission of the additional data to the UE.

9. The method of claim 1 wherein wirelessly transferring the additional data to the UE based on the impulse response matrix for the UE comprises controlling Multiple Input Multiple Output (MIMO) parameters for the transmission of the additional data to the UE.

10. The method of claim 1 wherein the OFDM system comprises a Long Term Evolution (LTE) eNodeB.

11. An Orthogonal Frequency Division Multiplex (OFDM) communication system comprising:
a User Equipment (UE) configured to select a Sounding Reference Signal (SRS) pattern and wirelessly transfer data including the SRS pattern; and
an OFDM access point configured to wirelessly receive and process the data from the UE to detect OFDM symbols, to process the detected OFDM symbols to identify the selected SRS pattern, to process the detected OFDM symbols based on the selected SRS pattern to generate an impulse response matrix for the UE, and to wirelessly transfer additional data to the UE based on the impulse response matrix for the UE.

12. The OFDM communication system of claim 11 wherein the UE is configured to select the SRS pattern based on wireless communication characteristics detected at the UE.

13. The OFDM communication system of claim 11 wherein the UE is configured to select the SRS pattern based on wireless signal strength detected at the UE.

14. The OFDM communication system of claim 11 wherein the UE is configured to select the SRS pattern based on UE mobility detected by the UE.

15. The OFDM communication system of claim 11 wherein the UE is configured to select the SRS pattern without wirelessly receiving an SRS instruction from the OFDM system.

16. The OFDM communication system of claim 11 wherein:
the UE has multiple antennas and is configured to select one of the antennas and transfer the OFDM symbols according to the selected SRS pattern over the selected one of the antennas; and
the OFDM access point is configured to process the detected OFDM symbols to identify the one of the antennas that transmitted the OFDM symbols.

17. The OFDM communication system of claim 11 wherein:
the UE has multiple antennas and is configured to select one of the antennas and transfer the OFDM symbols according to the selected SRS pattern using a particular polarity over the one of the selected antennas; and
the OFDM access point is configured to identify the one of the UE antennas that transmitted the OFDM symbols based on the particular polarity.

18. The OFDM communication system of claim 11 wherein the OFDM access point is configured to control beamforming parameters for the UE based on the impulse response matrix for the UE.

19. The OFDM communication system of claim 11 wherein the OFDM access point is configured to control Multiple Input Multiple Output (MIMO) parameters for the UE based on the impulse response matrix for the UE.

20. The OFDM communication system of claim 11 wherein the OFDM access point comprises a Long Term Evolution (LTE) eNodeB.

* * * * *